(12) United States Patent
Liu (10) Patent No.: US 12,222,762 B2
(45) Date of Patent: Feb. 11, 2025

(54) ELECTRONIC DEVICE

(71) Applicant: VIVO MOBILE COMMUNICATION CO., LTD., Dongguan (CN)

(72) Inventor: Weiyang Liu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 317 days.

(21) Appl. No.: 17/974,512

(22) Filed: Oct. 26, 2022

(65) Prior Publication Data

US 2023/0046687 A1 Feb. 16, 2023

Related U.S. Application Data

(63) Continuation of application No. PCT/CN2021/088821, filed on Apr. 22, 2021.

(30) Foreign Application Priority Data

Apr. 29, 2020 (CN) .......................... 202010354342.9

(51) Int. Cl.
*G06F 1/16* (2006.01)
*G01D 5/241* (2006.01)
*G09F 9/30* (2006.01)

(52) U.S. Cl.
CPC .......... *G06F 1/1641* (2013.01); *G06F 1/1622* (2013.01); *G06F 1/1677* (2013.01); *G09F 9/301* (2013.01); *G01D 5/241* (2013.01)

(58) Field of Classification Search
CPC . G06F 1/16; G06F 1/18; G06F 1/1622; G06F 1/1641; G06F 1/1677; G06F 3/033;
(Continued)

(56) References Cited

U.S. PATENT DOCUMENTS 5,936,613 A * 8/1999 Jaeger ................. G02F 1/13306
345/184
6,346,818 B2 * 2/2002 Wilson ................. G01D 5/2412
324/660
(Continued)

FOREIGN PATENT DOCUMENTS

CN 101470469 A 7/2009
CN 105408850 A 3/2016
(Continued)

OTHER PUBLICATIONS

International Search Report issued in corresponding International Application No. PCT/CN2021/088821, mailed Jul. 29, 2021, 4 pages.
(Continued)

*Primary Examiner* — Chanh D Nguyen
*Assistant Examiner* — Nguyen H Truong
(74) *Attorney, Agent, or Firm* — IPX PLLC (57) ABSTRACT

An electronic device is provided. The electronic device includes a first foldable main body, a second foldable main body disposed on a side of the first foldable main body, a rotating shaft disposed between the first foldable main body and the second foldable main body and configured to rotationally connect the two foldable main bodies, and a detection assembly configured to detect a relative angle between the two foldable main bodies.

9 Claims, 5 Drawing Sheets (58) Field of Classification Search
CPC ........ G06F 3/0338; G06F 3/041; G06F 3/044;
G06F 3/0362; G06F 3/04883; G06F
21/32; G09F 9/301; G01D 5/24; G01D
5/165; G01D 5/241; G01D 11/24; E06B
7/28; E05D 11/00; G09G 3/3225; G09G
5/00; A61B 5/117; G06V 10/147; G06V
40/13; G06V 40/18; G06V 40/60; G06V
40/70; H03M 11/00; H04M 1/02; H05K
1/02; H05K 1/11; H05K 1/16; H03K
17/96; H03K 17/98; G01B 7/16; G01B
7/30; H01L 27/32; G04G 21/00; G04B
3/04; A61M 5/315; G01R 27/26; G01L
3/10; H01G 5/00
See application file for complete search history.

(56) References Cited

U.S. PATENT DOCUMENTS

| | | | | |
|---|---|---|---|---|
| 2012/0313892 | A1* | 12/2012 | Philipp | G06F 3/045 |
| | | | | 345/174 |
| 2020/0159172 | A1* | 5/2020 | Bushnell | G04B 3/04 |

FOREIGN PATENT DOCUMENTS

| | | | | |
|---|---|---|---|---|
| CN | 106152933 | A | 11/2016 | |
| CN | 106438669 | A | 2/2017 | |
| CN | 107144216 | A | 9/2017 | |
| CN | 107168629 | A | 9/2017 | |
| CN | 108364574 | A | 8/2018 | |
| CN | 109426390 | A | 3/2019 | |
| CN | 109564450 | A | 4/2019 | |
| CN | 110417961 | A | 11/2019 | |
| CN | 110716611 | * | 1/2020 | ............ G06F 1/16 |
| CN | 110716611 | A | 1/2020 | |
| CN | 111562812 | A | 8/2020 | |
| JP | 2009100362 | A | 5/2009 | |
| KR | 101003752 | B1 | 12/2010 | |

OTHER PUBLICATIONS

First Office Action issued in related Chinese Application No. 202010354342.9, mailed Jun. 25, 2021, 7 pages.

Extended European Search Report issued in related European Application No. 21795700.0, mailed Sep. 28, 2023, 8 pages.

* cited by examiner

FIG. 7

ELECTRONIC DEVICE

CROSS-REFERENCE TO RELATED APPLICATIONS

This application is a continuation of International Application No. PCT/CN2021/088821, filed Apr. 22, 2021, which claims priority to Chinese Patent Application No. 202010354342.9, filed Apr. 29, 2020. The entire contents of each of the above-referenced applications are expressly incorporated herein by reference.

TECHNICAL FIELD

The present disclosure relates to the field of communications technologies, and in particular, to an electronic device.

BACKGROUND

For an electronic device having a flexibly foldable screen, in a case that a rotating action needs to be performed on the electronic device to meet demands such as human-computer interaction and function expansion, it is necessary to detect a folding angle accurately.

Figure 1:
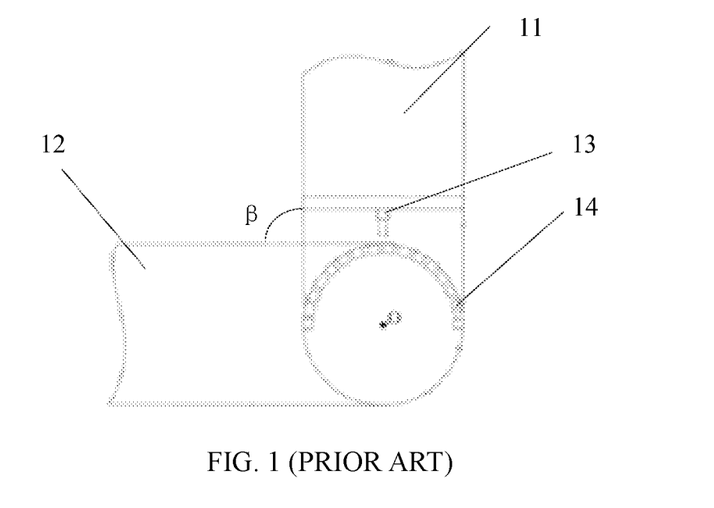
FIG. 1 is a schematic diagram of applying a light emitter and a receiver according to the prior art.

The prior art provides a scheme to detect a folding angle by using a light emitter and a receiver. As shown in FIG. 1, a first foldable main body 11, a second foldable main body 12, a light emitter 13, and a plurality of light receivers 14 arranged at intervals are used to determine a folding angle. The first foldable main body 11 is rotationally connected to the second foldable main body 12; the light emitter 13 is fixed relative to the first foldable main body 11; the plurality of light receivers 14 are fixed relative to the second foldable main body 12; the light emitter 13 can be selectively matched with one of the plurality of light receivers 14; and a processing unit is configured to: determine a target light receiver that is currently matched with the light emitter, and determine a folding angle of an electronic device with a foldable screen based on preset position information of the light receiver and the light emitter.

The existing light sensor—based scheme requires a great quantity of light receivers. However, because the space of a rotating shaft is limited, a quantity of light receivers that can be disposed is limited. In addition, in a case that a great quantity of light receivers are used, costs are increased; and in a case that the great quantity of light receivers are disposed on a relatively small rotating shaft, difficulty in design is increased, and a great quantity of detection port resources of a Central Processing Unit (CPU) chip are occupied.

In summary, an existing method for detecting a folding angle of an electronic device has the problems of high costs, great design difficulty, and high occupation of detection port resources.

SUMMARY

Embodiments of the present disclosure provide an electronic device.

An embodiment of the present disclosure provides an electronic device, including:
a first foldable main body;
a second foldable main body, disposed on a side of the first foldable main body;
a rotating shaft, disposed between the first foldable main body and the second foldable main body, wherein the first foldable main body and the second foldable main body are rotationally connected to each other by the rotating shaft; and
a detection assembly, configured to detect a relative angle between the first foldable main body and the second foldable main body, where
the detection assembly includes a first detection part and a second detection part, the first detection part is fixed relative to one of the first foldable main body and the second foldable main body, and the second detection part is fixed relative to the other one of the first foldable main body and the second foldable main body; and
the second detection part includes a plurality of capacitors, where the plurality of capacitors are disposed at intervals in a rotating direction of the first foldable main body and the second foldable main body, capacitances of the capacitors are different from one another, the first detection part is switchably connected to the plurality of capacitors, and in a case that the first detection part is connected to one of the capacitors, the first detection part is conducted with the second detection part to form a detection loop.

According to the technical solution of the present disclosure, a first detection part is fixed relative to one of two foldable main bodies; a second detection part is fixed relative to the other one of the two foldable main bodies; a detection loop is formed when the first detection part is switchably connected to a plurality of capacitors of the second detection part; and a relative angle between the first foldable main body and the second foldable main body is detected by the first detection part and the second detection part. Therefore, costs and space occupation can be reduced; and design difficulty can be decreased. In addition, detection for any angle can be realized, which improves detection performance.

DETAILED DESCRIPTION

The following describes the technical solutions in the embodiments of the present disclosure with reference to the accompanying drawings in the embodiments of the present disclosure. Apparently, the described embodiments are some but not all of the embodiments of the present disclosure. All other embodiments obtained by those of ordinary skill in the art based on the embodiments of the present disclosure without creative efforts shall fall within the protection scope of the present disclosure.

Figure 2:
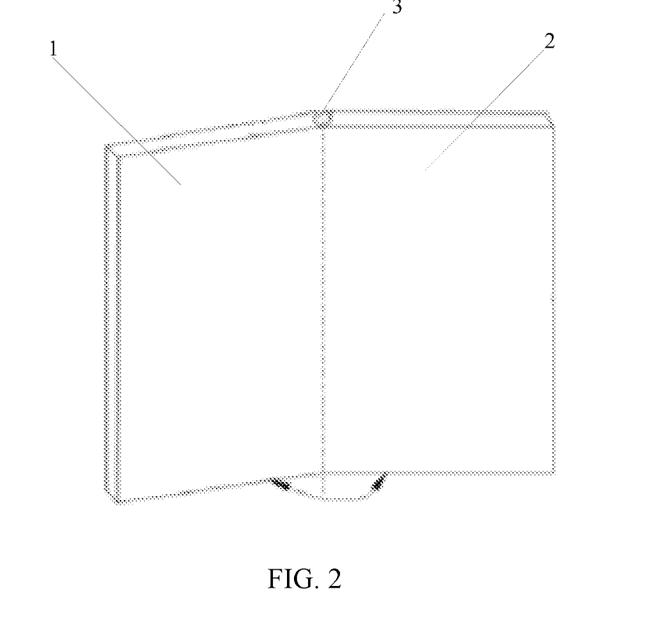
FIG. 2 is a schematic diagram of an electronic device according to an embodiment of the present disclosure.
Figure 3:
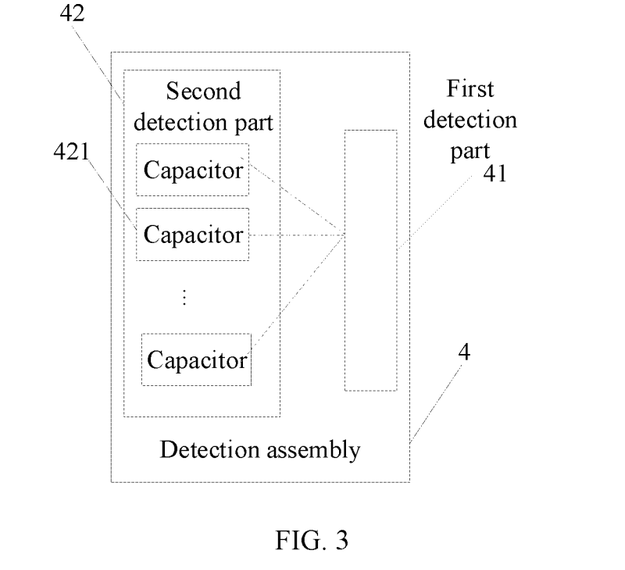
FIG. 3 is a schematic diagram of a detection assembly according to an embodiment of the present disclosure.

An embodiment of the present disclosure provides an electronic device. As shown in FIG. 2 and FIG. 3, the electronic device includes:

a first foldable main body 1;

a second foldable main body 2, disposed on a side of the first foldable main body 1;

a rotating shaft 3, disposed between the first foldable main body 1 and the second foldable main body 2, wherein the first foldable main body 1 and the second foldable main body 2 are rotationally connected to each other by the rotating shaft 3; and a detection assembly 4, configured to detect a relative angle between the first foldable main body 1 and the second foldable main body 2, where the detection assembly 4 includes a first detection part 41 and a second detection part 42, the first detection part 41 is fixed relative to one of the first foldable main body 1 or the second foldable main body 2, and the second detection part 42 is fixed relative to the other one of the first foldable main body 1 or the second foldable main body 2; and the second detection part 42 includes a plurality of capacitors 421, where the plurality of capacitors 421 are disposed at intervals in a rotating direction of the first foldable main body 1 and the second foldable main body 2, capacitances of the capacitors 421 are different from one another, the first detection part 41 is switchably connected to the plurality of capacitors 421, and in a case that the first detection part 41 is connected to one of the capacitors 421, the first detection part 41 is conducted with the second detection part 42 to form a detection loop. The detection loop includes a power supply. The power supply is separately connected to the first detection part 41 and the second detection part 42. The detection loop is formed when the first detection part 41 is in contact with the second detection part 42.

The electronic device in this embodiment of the present disclosure includes the first foldable main body 1, the second foldable main body 2 disposed on a side of the first foldable main body 1, the rotating shaft 3 disposed between the first foldable main body 1 and the second foldable main body 2, and the detection assembly 4.

The electronic device may be a mobile phone, a tablet personal computer, a laptop computer, a personal digital assistant (PDA), a mobile Internet device (MID), a wearable device, or the like.

The first foldable main body 1 is rotationally connected to the second foldable main body 2 by the rotating shaft 3. The first foldable main body 1 and the second foldable main body 2 may not be particularly distinguished. As shown in FIG. 2, a left foldable main body is the first foldable main body, and a right foldable main body is the second foldable main body; or the left foldable main body is the second foldable main body, and the right foldable main body is the first foldable main body. This embodiment of the present disclosure is described by using an example in which the left foldable main body is the first foldable main body and the right foldable main body is the second foldable main body. A case in which the left foldable main body is the second foldable main body and the right foldable main body is the first foldable main body is similar to the above case. Details are not described herein again.

The detection assembly 4 includes a first detection part 41 and a second detection part 42. The two detection parts are disposed at different positions. For example, the first detection part 41 is fixed relative to the first foldable main body 1, and the second detection part 42 is fixed relative to the second foldable main body 2; or the first detection part 41 is fixed relative to the second foldable main body 2, and the second detection part 42 is fixed relative to the first foldable main body 1.

The second detection part 42 includes a plurality of capacitors 421 that are disposed at intervals in a rotating direction of the first foldable main body 1 and the second foldable main body 2. When the first foldable main body 1 rotates clockwise, the second foldable main body 2 may rotate clockwise or counterclockwise. Distances between all adjacent capacitors 421 may be the same or different. All capacitances of the capacitors 421 are different. The capacitors 421 may be pF-grade capacitors.

Owing to a position relationship between the first detection part 41 and the second detection part 42 and rotational connection that is between the first foldable main body 1 and the second foldable main body 2 and that is implemented by the rotating shaft 3, the first detection part 41 can be switchably connected to the plurality of capacitors 421. In a case that the first detection part 41 is connected to one of the capacitors 421, the first detection part 41 is conducted with the second detection part 42 to form the detection loop.

After the detection loop is formed, the relative angle between the first foldable main body 1 and the second foldable main body 2 can be detected by the detection assembly 4. Each capacitor 421 may correspond to a folding angle between the first foldable main body 1 and the second foldable main body 2. When the first detection part 41 is conducted with the second detection part 42, the relative angle between the first foldable main body 1 and the second foldable main body 2 can be determined based on a capacitor 421 that is connected to the first detection part 41.

According to the above structure, a first detection part is fixed relative to one of two foldable main bodies; a second detection part is fixed relative to the other one of the two foldable main bodies; and a detection loop for detecting the relative angle between the first foldable main body and the second foldable main body is formed when the first detection part is switchably connected to a plurality of capacitors of the second detection part. Therefore, costs and space occupation can be reduced; and design difficulty can be decreased. In addition, detection for any angle can be realized, which improves detection performance.

In an embodiment of the present disclosure, as shown in FIG. 2 and FIG. 3, the first foldable main body 1 is fixed relative to the rotating shaft 3, the second foldable main body 2 is rotationally mounted on the rotating shaft 3, the first detection part 41 is mounted on the first foldable main body 1 or the rotating shaft 3, and the second detection part 42 is fixedly connected to the second foldable main body 2.

The first foldable main body 1 may be fixed relative to and connected to the rotating shaft 3, and the second foldable main body 2 is rotationally mounted on the rotating shaft 3. Because the first foldable main body 1 is fixed relative to the rotating shaft 3, the second foldable main body 2 can rotate relative to the first foldable main body 1. In this case, a form of a structure in which the first detection part 41 is fixed relative to one of the two foldable main bodies, and the second detection part 42 is fixed relative to the other one of the two foldable main bodies is as follows: The first detection part 41 is mounted on the first foldable main body 1, and the second detection part 42 is fixedly connected to the second foldable main body 2; or the first detection part 41 is mounted on the rotating shaft 3, and the second detection part 42 is fixedly connected to the second foldable main body 2.

For a case in which the first detection part 41 is mounted on the first foldable main body 1, the first detection part 41 may be disposed on an end surface, connected to the rotating shaft 3, of the first foldable main body 1, or disposed in the first foldable main body 1, provided that the first detection part 41 can protrude from the first foldable main body 1 and be connected to the second detection part 42. Accordingly, for a case in which the first detection part 41 is mounted on the rotating shaft 3, in a case that the first detection part 41 is an elastic component, the first detection part 41 may be disposed at any position of the rotating shaft 3, thereby being connected to the second detection part 42.

For a case in which the second detection part 42 is fixedly connected to the second foldable main body 2, the plurality of capacitors 421 included by the second detection part 42 may be disposed on an end surface, in contact with the rotating shaft 3, of the second detection part 42. In some embodiments, a cylinder sleeving the rotating shaft 3 is disposed in the second foldable main body 2, the plurality of capacitors 421 are disposed in a circumferential direction of the cylinder, such that the first detection part 41 can be switchably connected to the plurality of capacitors 421 in a rotating process of the second foldable main body 2.

It should be noted that the distances between all the adjacent capacitors 421 may be the same or different. Capacitances of all the capacitors 421 are different. In a case that the distances between all the adjacent capacitors 421 are the same, capacitances between all the adjacent capacitors 421 may increase or decrease at a preset gradient.

In the above structure, the first foldable main body is fixed relative to the rotating shaft; the second foldable main body can rotate related to the rotating shaft; and the first detection part disposed on the first foldable main body or the rotating shaft can be switchably connected to the plurality of capacitors by rotating the second foldable main body. Therefore, the detection loop can be formed to detect the relative angle between the two foldable main bodies.

As shown in FIG. 2 to FIG. 5, in a case in which the second detection part 42 is fixedly connected to the second foldable main body 2, the electronic device further includes a circuit board 5. A through hole is formed in the circuit board 5, the rotating shaft 3 penetrates the through hole, the plurality of capacitors 421 are disposed on the circuit board 5 at intervals in the circumferential direction of the rotating shaft 3, the circuit board 5 is fixed relative to the second foldable main body 2, and the first detection part 41 is fixed relative to the first foldable main body 1.

Figure 4:
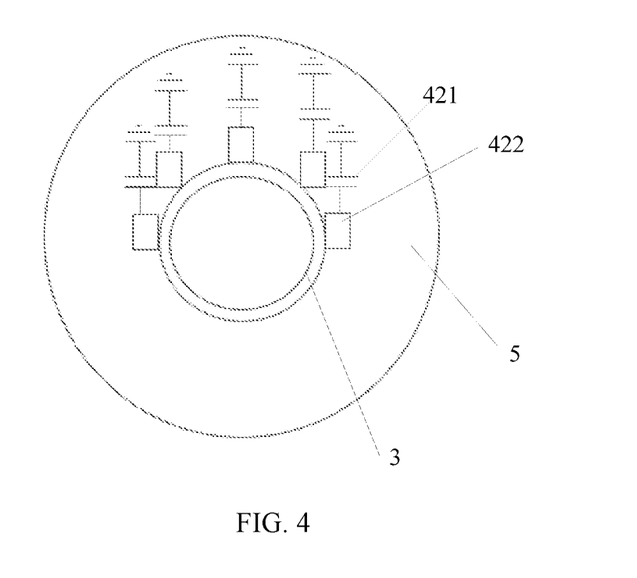
FIG. 4 is a first schematic diagram of matching a rotating shaft with a circuit board according to an embodiment of the present disclosure.
Figure 5:
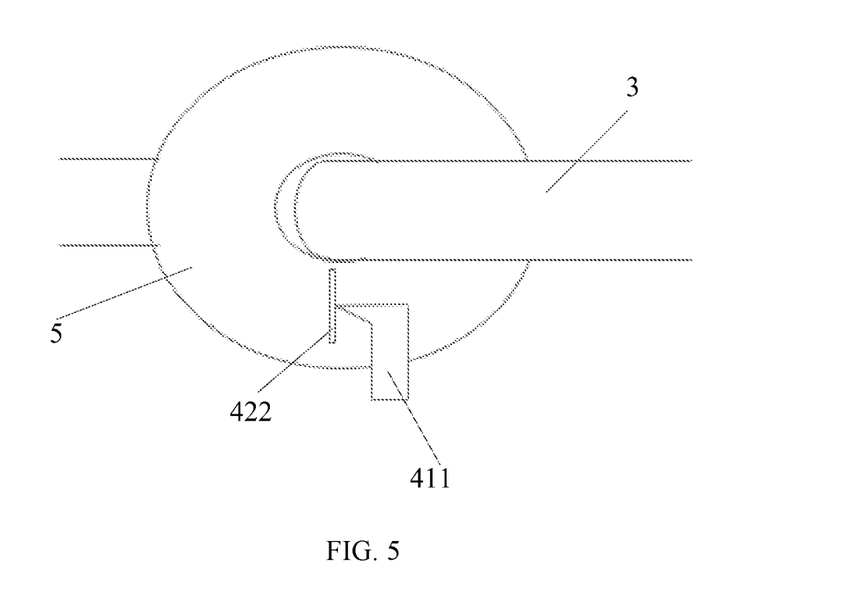
FIG. 5 is a second schematic diagram of matching a rotating shaft with a circuit board according to an embodiment of the present disclosure.

In this embodiment, the electronic device further includes the circuit board 5. The circuit board 5 may be a printed circuit board (PCB). A through hole may be formed in the circuit board 5. The rotating shaft 3 is connected to the circuit board 5 by penetrating the through hole. The capacitors 421 may be disposed on the circuit board 5 at intervals in the circumferential direction of the rotating shaft 3. Because the circuit board 5 is fixed relative to the second foldable main body 2, rotation of the second foldable main body 2 can drive the circuit board 5 to rotate. The first detection part 41 can be switchably connected to the plurality of capacitors 421 in a rotating process of the circuit board 5, where the first detection part 41 is fixed relative to the first foldable main body 1. Because the first foldable main body 1 is fixed relative to the rotating shaft 3, the first detection part 41 may be disposed on the first foldable main body 1 or the rotating shaft 3.

The circuit board 5 may be circular or of other shapes. The through hole is formed in a central position or other positions of the circuit board. When the circuit board is connected to the rotating shaft 3, the rotating shaft 3 may penetrate the through hole in the circuit board, thereby mounting the circuit board on the rotating shaft 3.

An angle corresponding to each capacitor 421 may be determined according to a layout of the plurality of capacitors 421, such that when the first detection part 41 is in contact with the capacitor 421, a corresponding angle between the two foldable main bodies can be determined. In this embodiment, the plurality of capacitors 421 are disposed on the circuit board 5 at intervals in the circumferential direction of the rotating shaft 3. In some embodiments, the plurality of capacitors 421 may be disposed around the rotating shaft 3 by one circle. For a case in which each capacitor 421 may correspond to one angle, in a process of rotating the second foldable main body 2 relative to the rotating shaft 3, the first detection part 41 can be switchably connected to the plurality of capacitors 421. The detection loop can be formed when the first detection part 41 is connected to the capacitor 421. Therefore, the angle between the two foldable main bodies can be detected.

When the capacitors 421 are disposed at intervals in the circumferential direction of the rotating shaft 3, a circumference corresponding to the rotating shaft 3 may be divided into equal parts or different arcs. For a case in which the circumference corresponding to the rotating shaft 3 is divided into different arcs, a length of each arc is required for determining an angle corresponding to each capacitor 421. For a case in which the circumference corresponding to the rotating shaft 3 is divided into equal parts, arcs corresponding to all the adjacent capacitors 421 are equal. In this case, the capacitances of all the adjacent capacitors 421 may increase or decrease at a preset gradient. Accordingly, angles corresponding to all the adjacent capacitors 421 may increase or decrease by a preset angle difference, such that differences between the angles corresponding to all the adjacent capacitors 421 are equal.

The following uses an exemplary embodiment to describe the case in which the plurality of capacitors 421 divide the circumference corresponding to the rotating shaft 3 into equal parts. As shown in FIG. 2 to FIG. 5, when the second foldable main body 2 rotates around the rotating shaft 3, the circuit board 5 rotates around the rotating shaft 3 by a same angle under the driving of the second foldable main body 2, and the first detection part 41 is disposed on the first foldable main body 1 or the rotating shaft 3, and can be switchably connected to the plurality of capacitors 421 disposed on the circuit board 5, thereby determining the angle between the two foldable main bodies. When a quantity of the capacitors 421 is N, and the N capacitors 421 are sequentially disposed at intervals on a 360° circumference, a corresponding relation between the capacitors 421 and angles can be established. For example, when N is 10, the quantity of the capacitors 421 is 10, and an angle corresponding to the capacitor 421 is $(360/N)*(a-1)$, where a is a number in the 10 capacitors 421. For details, refer to the following table:

| Capacitance | Capacitor number | Angle |
| --- | --- | --- |
| 0 | 1 | 0 |
| 10 | 2 | 36 |

-continued

| Capacitance | Capacitor number | Angle |
|---|---|---|
| 20 | 3 | 72 |
| 30 | 4 | 108 |
| 40 | 5 | 144 |
| 50 | 6 | 180 |
| 60 | 7 | 216 |
| 70 | 8 | 252 |
| 80 | 9 | 288 |
| 90 | 10 | 324 |

For example, the following can be learned according to the corresponding relation in the table: When it is detected that a capacitance of the capacitor 421 is 10, it can be determined that a corresponding number is 2, and that a corresponding folding angle is 36°. Details about other cases are not described herein again.

It should be noted that, a number and a corresponding angle of a capacitor may be determined in the following process: First, determine, as 1, a number of a capacitor corresponding to 0° on the circumference corresponding to the rotating shaft; then, determine lengths of arcs between the capacitor and the other capacitors; obtain central angles corresponding to the lengths of the arcs; determine the central angles as angles corresponding to the other capacitors; and sequentially determine capacitor numbers in ascending order of the angles, where the capacitor numbers are positively correlated with the angles, and capacitances of the capacitors are positively correlated with the capacitor numbers.

For a case in which the plurality of capacitors 421 divide the circumference corresponding to the rotating shaft 3 into different arcs, the lengths of the arcs between adjacent capacitors 421 may increase sequentially. In this case, differences between angles corresponding to the adjacent capacitors 421 increase sequentially. In this case, the capacitors 421 may also be numbered one by one. To facilitate memorization, it may be specified that the capacitances of the capacitors 421 sequentially increase or decrease in an extending direction of the arcs; or a corresponding relation between the capacitances of the capacitors 421 and numbers is established, for example, a capacitor 421 whose capacitance is greater has a greater number. In a case that the capacitor 421 is in contact with the first detection part 41, a number is determined based on an obtained capacitance. Then, the angle between the two foldable main bodies is determined.

In the above structure, the circuit board is disposed on the rotating shaft, and the plurality of capacitors are disposed on the circuit board in the circumferential direction of the rotating shaft, and are driven to rotate when the second foldable main body rotates around the rotating shaft, such that the first detection part can be switchably connected to the plurality of capacitors. Therefore, the detection loop can be formed to detect the relative angle between the two foldable main bodies.

In an embodiment of the present disclosure, as shown in FIG. 2 and FIG. 3, the first foldable main body 1 can rotate relative to the rotating shaft 3, the second foldable main body 2 can rotate relative to the rotating shaft 3, the first detection part 41 is mounted on the first foldable main body 1, and the second detection part 42 is fixedly connected to the second foldable main body 2.

In this embodiment, both the first foldable main body 1 and the second foldable main body 2 can rotate relative to the rotating shaft 3. In this case, the first detection part 41 is mounted on the first foldable main body 1, and the second detection part 42 is fixedly connected to the second foldable main body 2.

In a process in which only the first foldable main body 1 rotates relative to the rotating shaft 3, the first detection part 41 disposed on the first foldable main body 1 rotates with the first foldable main body 1, and is switchably connected to the plurality of capacitors 421 disposed on the second foldable main body 2 in sequence. Therefore, the detection loop can be formed to detect the relative angle between the two foldable main bodies.

In a process in which only the second foldable main body 2 rotates relative to the rotating shaft 3, the plurality of capacitors 421 disposed on the second foldable main body 2 rotate with the second foldable main body 2, the first detection part 41 disposed on the first foldable main body 1 is kept stationary, the plurality of capacitors 421 are sequentially connected to the first detection part 41. Therefore, the detection loop can be formed to detect the relative angle between the two foldable main bodies.

In a process in which both the first foldable main body 1 and the second foldable main body 2 rotate relative to the rotating shaft 3, the plurality of capacitors 421 disposed on the second foldable main body 2 rotate with the second foldable main body 2, the first detection part 41 disposed on the first foldable main body 1 rotates with the first foldable main body 1, the first detection part 41 is switchably connected to the plurality of capacitors 421 in sequence. Therefore, the detection loop can be formed to detect the relative angle between the two foldable main bodies.

Each capacitor 421 may correspond to a folding angle between the first foldable main body 1 and the second foldable main body 2. When the first detection part 41 is conducted with the second detection part 42, the relative angle between the first foldable main body 1 and the second foldable main body 2 can be determined based on a capacitor 421 that is connected to the first detection part 41.

In the above structure, it is specified that the first foldable main body and the second foldable main body rotate relative to the rotating shaft; and the first detection part is switchably connected to the plurality of capacitors by rotating the second foldable main body and/or the first foldable main body. Therefore, the detection loop can be formed to detect the relative angle between the two foldable main bodies.

In an embodiment of the present disclosure, as shown in FIG. 2 to FIG. 5, the first detection part 41 includes a conductive spring plate 411, the conductive spring plate 411 is provided with a protruding part, and the protruding part is switchably connected to the plurality of capacitors 421.

In this embodiment, the first detection part 41 includes the conductive spring plate 411 that is provided with the protruding part; and the conductive spring plate 411 is switchably connected to the plurality of capacitors 421 through the protruding part. For example, the first foldable main body 1 is rotationally connected to the second foldable main body 2 by the rotating shaft 3; the first detection part 41 is fixed relative to one of the two foldable main bodies; and the plurality of capacitors 421 are fixed relative to the other one of the two foldable main bodies. Therefore, the conductive spring plate 411 can be switchably connected to the plurality of capacitors 421 in sequence through the protruding part.

The conductive spring plate provided with the protruding part can be conveniently connected to the capacitor when the conductive spring plate is disposed at any position. Therefore, the position of the conductive spring plate is diversified.

The second detection part 42 further includes a plurality of conductive parts 422, each of the conductive parts 422 is connected to one of the capacitors 421, and in a case that the protruding part is connected to one of the conductive parts 422, the conductive spring plate 411, the conductive part 422, and the capacitor 421 are conducted with one another to form the detection loop.

The second detection part 42 includes the plurality of capacitors 421 and the plurality of conductive parts 422. Each conductive part 422 may include a copper-exposed region. A quantity of the capacitors 421 is the same as a quantity of the conductive parts 422. Each capacitor 421 is correspondingly connected to one conductive part 422. When the first detection part 41 is switchably connected to the plurality of capacitors 421 to form the detection loop, the protruding part of the conductive spring plate 411 is connected to one conductive part 422. In some embodiments, the protruding part is connected to the copper-exposed region of the conductive part 422. Because the conductive part 422 is correspondingly connected to one capacitor 421, the conductive spring plate 411 can be connected to the capacitor 421. Therefore, the conductive spring plate 411, the conductive part 422, and the capacitor 421 form the detection loop. This enables the conductive spring plate 411 to be switchably connected to the plurality of capacitors 421 in sequence.

The conductive spring plate 411 may be a metal spring plate. In some embodiments, the conductive spring plate 411 is an antenna spring plate. Connection between the conductive spring plate 411 and the conductive part 422 is implemented via contact between the metal spring plate and the copper-exposed region.

In the above structure, the conductive spring plate, the conductive part, and the capacitor are conducted to form the detection loop. Therefore, in a case that the conductive spring plate is in contact with the conductive part, the conductive spring plate can be switchably connected to the plurality of capacitors in sequence.

In an embodiment of the present disclosure, as shown in FIG. 3, each capacitor 421 is grounded. Forming of the detection loop can be guaranteed by setting the capacitor 421 to be grounded.

In an embodiment of the present disclosure, as shown in FIG. 2, FIG. 3, and FIG. 6a to FIG. 6c, the detection loop further includes a capacitance reader 61 and a controller 62 connected to the capacitance reader 61. The capacitance reader 61 obtains a current capacitance of one of the capacitors 421 that is connected to the first detection part 41, and the controller 62 stores a target capacitance and obtains the relative angle between the first foldable main body 1 and the second foldable main body 2 based on the current capacitance and the target capacitance.

Figure 6A:
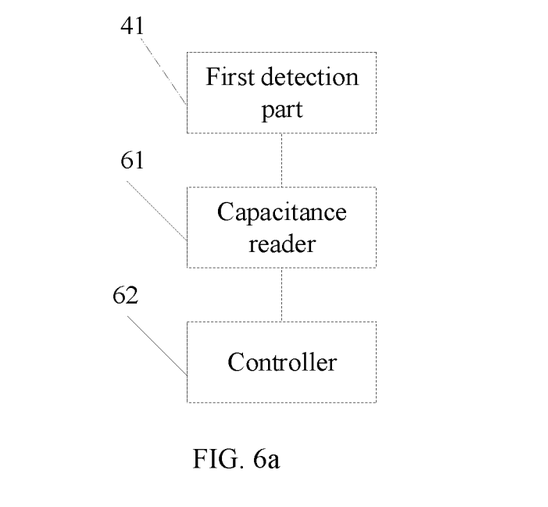
FIG. 6a is a schematic diagram of connecting a capacitance reader with a controller and a first detection part according to an embodiment of the present disclosure.
Figure 6B:
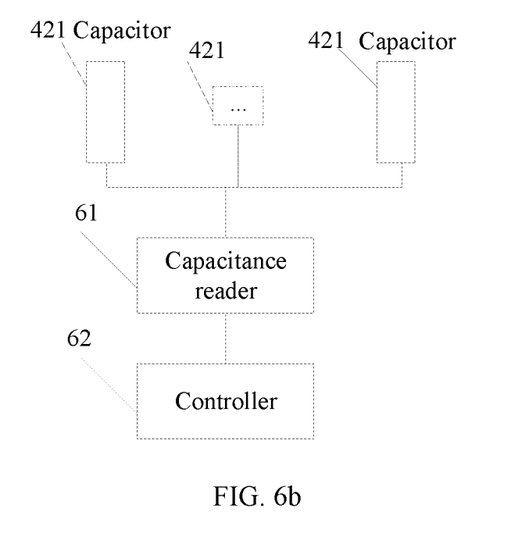
FIG. 6b is a schematic diagram of connecting a capacitance reader with a controller and a capacitor according to an embodiment of the present disclosure.
Figure 6C:
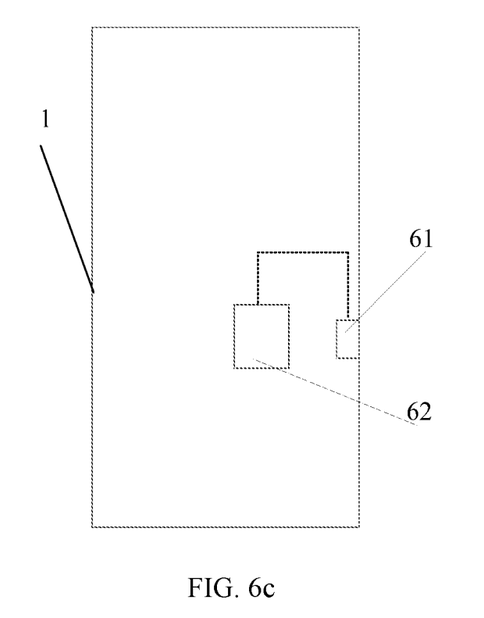
FIG. 6c is a schematic diagram of disposing a capacitance reader and a controller on a foldable main body according to an embodiment of the present disclosure.

In addition to the first detection part 41 and the second detection part 42, the detection loop further includes the capacitance reader 61 and the controller 62. The capacitance reader 61 and the controller 62 may be disposed on the first foldable main body 1, the second foldable main body 2, or the rotating shaft 3. The capacitance reader 61 may be connected to the first detection part 41, and be configured to read, in a case that the first detection part 41 is connected to one of the capacitors 421, a capacitance of the current capacitor 421 connected to the first detection part 41. The capacitance reader 61 may also be connected to each capacitor 421, and be configured to read a capacitance of the current capacitor 421 that is connected to the first detection part 41.

The capacitance reader 61 may also be replaced with a voltage capacitance reader. The voltage capacitance reader reads a voltage corresponding to the capacitor 421, to determine the capacitance of the capacitor 421. Then, the relative angle between the first foldable main body 1 and the second foldable main body 2 is obtained.

After obtaining the capacitance of the current capacitor 421 connected to the first detection part 41, the capacitance reader 61 may send the current capacitance corresponding to the current capacitor 421 to the controller 62. The controller 62 stores the target capacitance, and can obtain the relative angle between the first foldable main body 1 and the second foldable main body 2 based on the current capacitance corresponding to the current capacitor 421 and the target capacitance.

The relative angle between the first foldable main body 1 and the second foldable main body 2 can be determined based on the current capacitance corresponding to the current capacitor 421 and the target capacitance in the following process: Compare the current capacitance with the target capacitance; and in a case that the current capacitance is successfully matched with the target capacitance, determine a relative angle corresponding to the target capacitance as the relative angle that is between the first foldable main body 1 and the second foldable main body 2 and that corresponds to the current capacitor 421.

As shown in FIG. 2, FIG. 3, FIG. 4, and FIG. 6a to FIG. 6c, the plurality of capacitors 421 are uniformly disposed at intervals, there are a plurality of target capacitances that are in a one-to-one correspondence with the plurality of capacitors 421, and each of the target capacitances corresponds to one relative angle between the first foldable main body 1 and the second foldable main body 2.

As the plurality of capacitors 421 are uniformly disposed at intervals, distances between all adjacent capacitors 421 are the same. In this case, it may be specified that differences between all the adjacent capacitors 421 are the same, such that the capacitances of the plurality of capacitors 421 increase sequentially in a specific direction.

A quantity of the target capacitances is equal to the quantity of the capacitors 421, and the target capacitances are in a one-to-one correspondence with the plurality of capacitors 421. In a case that the first detection part 41 is connected to one of the capacitors 421, the current capacitance obtained by the capacitance reader 61 is compared with the target capacitance corresponding to the current capacitor 421. In a case that the current capacitance is consistent with the target capacitance, a relative angle corresponding to the target capacitance is determined as the relative angle that is between the two foldable main bodies and that corresponds to the current capacitor 421.

In the above structure, in a case that the capacitance of the current capacitor is determined, a relative angle corresponding to the current capacitor is determined based on the relative angle corresponding to the target capacitance.

Figure 7:
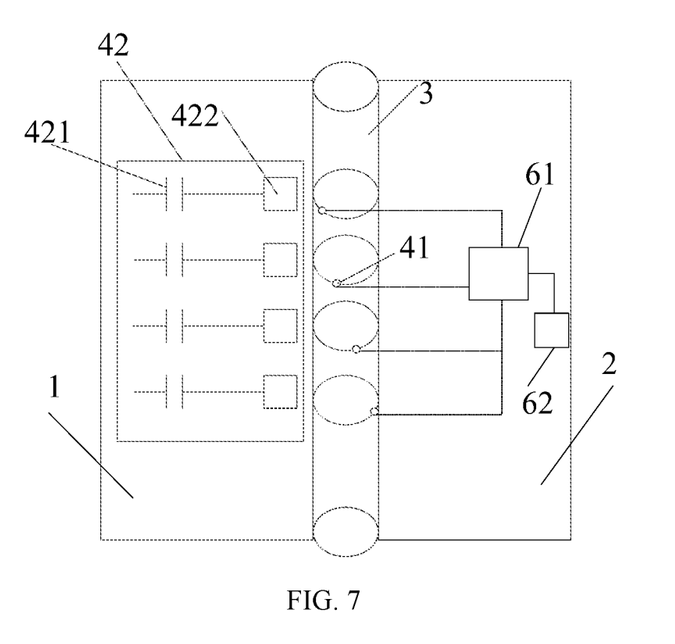
FIG. 7 is a schematic diagram of disposing a plurality of first detection parts on an electronic device according to an embodiment of the present disclosure.

It should be noted that all the above embodiments are cases implemented in a case that only one first detection part is disposed. Those skilled in the art may also dispose a plurality of first detection parts. In addition, the plurality of first detection parts are disposed in a one-to-one correspondence with the plurality of capacitors; and one first detection part and one capacitor form one detection loop. As shown in FIG. 7, the second detection part 42 including the plurality of capacitors 421 and the plurality of conductive parts 422 is disposed on the first foldable main body 1; and the plurality of first detection parts 41 are disposed on the rotating shaft 3, extend along an axis of the rotating shaft 3, and are arranged sequentially in the circumferential direction of the rotating shaft 3. The first foldable main body 1 can rotate relative to the rotating shaft 3. In this case, the rotating shaft 3 is fixed relative to the second foldable main body 2. When the first foldable main body 1 rotates relative to the rotating shaft 3, the plurality of conductive parts 422 disposed on the first foldable main body 1 are sequentially conducted with the plurality of first detection parts 41 disposed on the rotating shaft 3, such that the first detection parts 41, the conductive parts 422, and the capacitors 421 are conducted to form the detection loop, where each time of conduction corresponds to a unique detection loop. Each detection loop corresponds to a unique first detection part 41, a unique conductive part 422, and a unique capacitor 421. Each first detection part 41 may be connected to the capacitance reader 61, such that the capacitance reader 61 obtains the current capacitance of the current capacitor 421 connected to the first detection part 41. The capacitance reader 61 may be connected to the controller 62, such that the controller 62 obtains the relative angle between the first foldable main body 1 and the second foldable main body 2 based on the current capacitance and the target capacitance. Certainly, the plurality of first detection parts may also be disposed in another structure. For example, both the first foldable main body and the second foldable main body can rotate relative to the rotating shaft; the second detection part is disposed on the first foldable main body; and the plurality of first detection parts are disposed on the second foldable main body. There may also be other structural forms which are not enumerated herein.

According to the above embodiments of the electronic device in the present disclosure, a first detection part is fixed relative to one of two foldable main bodies; a second detection part is fixed relative to the other one of the two foldable main bodies; a detection loop is formed when the first detection part is switchably connected to a plurality of capacitors of the second detection part; and a relative angle between the first foldable main body and the second foldable main body is detected by the first detection part and the second detection part. Therefore, costs and space occupation can be reduced; and design difficulty can be decreased. In addition, detection for any angle can be realized, which improves detection performance.

Each embodiment in this specification is described in a progressive manner, each embodiment focuses on the difference from other embodiments, and the same and similar parts between the embodiments may refer to each other.

Although optional embodiments of the present disclosure have been described, those skilled in the art may make additional changes and modifications to these embodiments once they learn the basic inventive concept. Therefore, the appended claims are intended to be construed as covering the optional embodiments and all changes and modifications falling within the scope of the embodiments of the present disclosure.

Finally, it should be further noted that, in this specification, relationship terms such as first and second are only used to distinguish an entity or operation from another entity or operation, but do not necessarily require or imply that there is any actual relationship or order between these entities or operations. Moreover, the terms "include", "comprise", or any of their variants are intended to cover a non-exclusive inclusion, so that a process, a method, an article, or a terminal device that includes a list of elements not only includes those elements but also includes other elements that are not listed, or further includes elements inherent to such a process, method, article, or terminal device. Without being subject to further limitations, an element defined by a phrase "including a . . . " does not exclude presence of other identical elements in the process, method, article, or terminal device that includes the very element.

The embodiments of the present disclosure are described above with reference to the accompanying drawings, but the present disclosure is not limited to the foregoing implementation manners, and the foregoing implementation manners are only illustrative and not restrictive. Under the enlightenment of the present disclosure, a person of ordinary skill in the art can make many forms without departing from the purpose of the present disclosure and the protection scope of the claims, and all of these fall within the protection of the present disclosure.

The invention claimed is:

1. An electronic device, comprising:
   a first foldable main body;
   a second foldable main body, disposed on a side of the first foldable main body;
   a rotating shaft, disposed between the first foldable main body and the second foldable main body, wherein the first foldable main body and the second foldable main body are rotationally connected to each other by the rotating shaft; and
   a detection assembly, configured to detect a relative angle between the first foldable main body and the second foldable main body,
   wherein the detection assembly comprises a first detection part and a second detection part, the first detection part is fixed relative to one of the first foldable main body or the second foldable main body, and the second detection part is fixed relative to the other one of the first foldable main body or the second foldable main body; and
   the second detection part comprises a plurality of capacitors, wherein the capacitors are disposed at intervals in a rotating direction of the first foldable main body and the second foldable main body, capacitances of the capacitors are different from one another, the first detection part is switchably connected to the capacitors, and in a case that the first detection part is connected to one of the capacitors, the first detection part is conducted with the second detection part to form a detection loop.

2. The electronic device according to claim 1, wherein the first foldable main body is fixed relative to the rotating shaft, the second foldable main body is rotationally mounted on the rotating shaft, the first detection part is mounted on the first foldable main body or the rotating shaft, and the second detection part is fixedly connected to the second foldable main body.

3. The electronic device according to claim 2, further comprising:
   a circuit board, wherein a through hole is formed in the circuit board, the rotating shaft penetrates the through hole, the capacitors are disposed on the circuit board at intervals in a circumferential direction of the rotating shaft, the circuit board is fixed relative to the second foldable main body, and the first detection part is fixed relative to the first foldable main body.

4. The electronic device according to claim 1, wherein the first foldable main body is configured to rotate relative to the rotating shaft, the second foldable main body is configured to rotate relative to the rotating shaft, the first detection part is mounted on the first foldable main body, and the second detection part is fixedly connected to the second foldable main body.

5. The electronic device according to claim 1, wherein the first detection part comprises a conductive spring plate, the conductive spring plate is provided with a protruding part, and the protruding part is switchably connected to the capacitors.

6. The electronic device according to claim 5, wherein the second detection part further comprises a plurality of conductive parts, each of the conductive parts is connected to one of the capacitors, and in a case that the protruding part is connected to one of the conductive parts, the conductive spring plate, the conductive part, and the capacitor are conducted with one another to form the detection loop.

7. The electronic device according to claim 1, wherein each capacitor is grounded.

8. The electronic device according to claim 1, wherein the detection loop further comprises a capacitance reader and a controller connected to the capacitance reader, the capacitance reader obtains a current capacitance of one of the capacitors that is connected to the first detection part, and the controller stores a target capacitance and obtains the relative angle between the first foldable main body and the second foldable main body based on the current capacitance and the target capacitance.

9. The electronic device according to claim 8, wherein the capacitors are uniformly disposed at intervals in a one-to-one correspondence with a plurality of target capacitances, wherein each of the target capacitances corresponds to one relative angle between the first foldable main body and the second foldable main body.

* * * * *